US010525541B2

(12) United States Patent
Saegesser et al.

(10) Patent No.: US 10,525,541 B2
(45) Date of Patent: Jan. 7, 2020

(54) TRANSMISSION DEVICE

(71) Applicant: Robert Bosch GmbH, Stuttgart (DE)

(72) Inventors: Daniel Saegesser, Langenthal (CH); Michael Laett, Solothurn (CH)

(73) Assignee: Robert Bosch GmbH, Stuttgart (DE)

( * ) Notice: Subject to any disclaimer, the term of this patent is extended or adjusted under 35 U.S.C. 154(b) by 509 days.

(21) Appl. No.: 15/377,161

(22) Filed: Dec. 13, 2016

(65) Prior Publication Data

US 2017/0173711 A1    Jun. 22, 2017

(30) Foreign Application Priority Data

Dec. 16, 2015  (DE) .......................... 10 2015 225 381

(51) Int. Cl.
*B23D 51/16* (2006.01)
*B23D 49/16* (2006.01)
*F16H 25/14* (2006.01)

(52) U.S. Cl.
CPC ........... *B23D 51/16* (2013.01); *B23D 49/162* (2013.01); *F16H 25/14* (2013.01)

(58) Field of Classification Search
CPC ...... B23D 51/16; B23D 49/162; B23D 49/16; F16H 25/14
See application file for complete search history.

(56) References Cited

U.S. PATENT DOCUMENTS

| | | | |
|---|---|---|---|
| 3,971,132 A | 7/1976 | Griffies et al. | |
| 3,977,739 A * | 8/1976 | Moskowitz | F16C 33/6644 384/446 |
| 5,402,580 A * | 4/1995 | Seto | B23B 31/202 279/52 |
| 6,282,797 B1 * | 9/2001 | Osada | B23D 49/165 30/392 |
| 6,286,217 B1 * | 9/2001 | Dassoulas | B23D 51/16 30/220 |
| 7,913,403 B1 * | 3/2011 | Willetts | A01G 3/08 30/166.3 |
| 2004/0117993 A1 | 6/2004 | Armstrong | |

(Continued)

FOREIGN PATENT DOCUMENTS

| | | |
|---|---|---|
| DE | 10 2004 055 271 A1 | 5/2006 |
| DE | 10 2009 000 031 A1 | 7/2010 |
| GB | 891832 A | 3/1962 |

*Primary Examiner* — William Kelleher
*Assistant Examiner* — Gregory T Prather
(74) *Attorney, Agent, or Firm* — Maginot, Moore & Beck LLP

(57) ABSTRACT

A transmission device is configured to generate at least one of a stroke motion and a reciprocating motion of an insert tool of a hand-held power tool, and includes at least one link unit configured to generate the stroke motion. The link unit includes at least one output element, at least one link element, at least one contact surface, and at least one further contact surface. The at least one contact surface is disposed at least partially on the at least one output element. The at least one link element is configured to act in combination with the at least one output element via the at least one contact surface. The at least one further contact surface is configured to generate a force that initiates the reciprocating motion, and is disposed at least partially on the at least one output element.

11 Claims, 6 Drawing Sheets

(56) References Cited

U.S. PATENT DOCUMENTS

| | | | | |
|---|---|---|---|---|
| 2004/0187323 | A1* | 9/2004 | Hartmann | B23D 49/165 30/392 |
| 2005/0126018 | A1* | 6/2005 | Haas | B23D 51/16 30/394 |
| 2005/0178223 | A1* | 8/2005 | Li | B23D 51/16 74/25 |
| 2007/0102175 | A1* | 5/2007 | Lamanna | B23D 51/16 173/114 |
| 2008/0229591 | A1* | 9/2008 | Saegesser | B23D 49/162 30/519 |
| 2010/0126027 | A1* | 5/2010 | Oberheim | B23D 49/16 30/392 |
| 2011/0107608 | A1* | 5/2011 | Wattenbach | B23D 49/165 30/394 |
| 2011/0265335 | A1 | 11/2011 | Bantle et al. | |
| 2014/0190023 | A1* | 7/2014 | Vitantonio | B23D 51/16 30/369 |
| 2015/0209880 | A1* | 7/2015 | Letendre | B23D 49/08 83/644 |
| 2017/0157689 | A1* | 6/2017 | Doumani | B23D 49/162 |
| 2017/0361386 | A1* | 12/2017 | Lu | B23D 49/16 |

\* cited by examiner

TRANSMISSION DEVICE

This application claims priority under 35 U.S.C. § 119 to patent application no. DE 10 2015 225 381.1, filed on Dec. 16, 2015 in Germany, the disclosure of which is incorporated herein by reference in its entirety.

BACKGROUND

A transmission device for generating a stroke motion and/or reciprocating motion of an insert tool of a hand-held power tool, having at least one link unit, for generating the stroke motion, which comprises at least one output element having at least one contact surface that is disposed, at least partially, on the at least one output element, and at least one link element, which acts in combination with the at least one output element via the at least one contact surface, has already been proposed.

SUMMARY

The disclosure is based on a transmission device for generating a stroke motion and/or reciprocating motion of an insert tool of a hand-held power tool, having at least one link unit, for generating the stroke motion, which comprises at least one output element having at least one contact surface that is disposed, at least partially, on the at least one output element, and at least one link element, which acts in combination with the at least one output element via the at least one contact surface.

It is proposed that the at least one link unit comprise at least one further contact surface, for generating a force component for initiating the reciprocating motion, that is disposed, at least partially, on the at least one output element. An advantageously compact design of the transmission device, and thus a preferably slender design of the hand-held power tool, in particular having an advantageously small housing diameter in a neck region of the hand-held power tool, can thereby be achieved.

A "link unit" in this context is to be understood to mean, in particular, a unit designed to convert a rotary motion into a translational motion. The at least one link unit is designed to convert a rotary drive motion of a drive unit of the hand-held power tool at least into a translational stroke motion of the insert tool of the hand-held power tool. The at least one link element of the at least one link unit preferably at least partially delimits at least one link path, a "link path" to be understood to mean, in particular, a path for guiding an element in a constrained manner on at least one side, preferably both sides. The at least one link path, which is delimited, at least partially, by the at least one link element, is preferably realized as a web, slot and/or groove. The element guided in the link path is preferably constituted by the at least one output element, which engages in the at least one link path. When the transmission device is in a mounted state, the at least one link element is, in particular, directly connected to a stroke rod for transferring the stroke motion to the insert tool. When the transmission device is in a mounted state, the at least one link element is fixedly connected to a stroke rod. When the transmission device is in a mounted state, the at least one link element is connected to a stroke rod by a welded connection. The insert tool is preferably constituted by a saw blade, in particular a saber saw blade.

The at least one output element is preferably constituted by an output pin. The at least one contact surface disposed on the at least one output element is realized, advantageously, as a radial contact surface. Particularly preferably, the at least one contact surface realized on the at least one output element is designed for directly contacting the at least one link element, in particular the at least one link path delimited by the at least one link element. In an operating state, the at least one output element is preferably mounted so as to be movable relative to the at least one link element. Preferably, disposed on the at least one output element there is at least one rolling element, which at least partially constitutes the at least one contact surface and which, advantageously, contacts the at least one link element. The at least one output element is preferably fixedly connected to a transmission element of the transmission device. The transmission element is preferably constituted by a ring gear, which is realized, advantageously, such that it can be driven in rotation by the drive unit of the hand-held power tool, when the transmission device is in a mounted state. In particular, the at least one output element is disposed eccentrically in relation to a rotation axis of the transmission element.

The at least one further contact surface, disposed on the at least one output element, is realized, advantageously, as a contact surface disposed axially or on a front face on the at least one output element. The at least one contact surface for generating the stroke motion and the at least one further contact surface for generating the reciprocating motion are preferably disposed in an at least partially, particularly preferably entirely, spatially separated manner on the at least one output element.

It is additionally proposed that the at least one link unit comprise at least one rotatably mounted rolling element, which constitutes, at least partially, the at least one contact surface for generating a force component for initiating the reciprocating motion. This makes it possible, by simple design means, to achieve a preferably low-wear design of the at least one contact surface for generating a force component for initiating the reciprocating motion. "Rotatably mounted" in this context is to be understood to mean, in particular, that the at least one rolling element is mounted so as to be movable about an axis. The at least one rolling element is preferably rotatably mounted on the at least one output element. It is also conceivable, however, for the at least one contact surface for generating the reciprocating motion to be constituted directly by a subsection of the at least one output element.

Furthermore, it is proposed that the at least one rolling element be mounted so as to be rotatable about an axis that is perpendicular to a longitudinal direction of the at least one output element. It is thereby possible to achieve a preferably compact design of the transmission device for generating the reciprocating motion. When the transmission device is in a mounted state, the axis about which the at least one rolling element is rotatably mounted is perpendicular to a rotation axis of the transmission element to which the at least one output element is fixedly connected. When the transmission device is in a mounted state, the axis about which the at least one rolling element is rotatably mounted is perpendicular to a stroke direction of the stroke motion that is generated by means of the at least one radial contact surface.

It is additionally proposed that the at least one rolling element be constituted by a ball bush. It is thereby possible to achieve a design of the at least one rolling element that has a simple structure and is advantageously inexpensive, and that is preferably durable. Alternatively, it is also conceivable for the at least one rolling element to be realized, at least partially, as a barrel roller. The at least one rolling element is preferably realized such that it is pressed onto a bearing, in particular onto a ball bearing.

It is further proposed that the transmission device have at least one bearing element, for supporting the at least one link element, on which is disposed at least one contact surface that, in at least one driving mode, at least partially contacts the contact surface, disposed on the at least one output element, for generating a force component for initiating the reciprocating motion. It is thereby possible to achieve an advantageously compact design for initiating and transferring the reciprocating motion to the insert tool, in particular via the stroke rod. The at least one bearing element is preferably designed to indirectly support the at least one link element, at least via the stroke rod of the hand-held power tool. The at least one bearing element is preferably designed to support the at least one link element in a displaceable manner, in particular parallel to the stroke direction. The at least one bearing element is preferably realized as a bearing rocker. When the transmission device is in a mounted state, the at least one bearing element is mounted, advantageously, so as to be pivotable, at least partially, relative to a housing of the hand-held power tool. The at least one contact surface disposed on the at least one bearing element is preferably realized as a plane. The at least one contact surface disposed on the at least one bearing element is preferably disposed obliquely in relation to a stroke direction and/or in relation to a longitudinal direction of the at least one output element. The at least one contact surface disposed on the at least one bearing element is designed to directly contact the at least one contact surface disposed on the at least one output element. In an operating state, the at least one rolling element preferably rolls, at least partially and/or at least temporarily, on the at least one contact surface disposed on the at least one bearing element.

Furthermore, it is proposed that the at least one contact surface disposed on the at least one bearing element be inclined about at least one axis, the axis extending in a plane, the surface normal of which is disposed parallel to a longitudinal direction of the at least one output element, and the axis extending obliquely in relation to a stroke direction. It is thereby possible to achieve that, in an operating state, the reciprocating motion of the insert tool and the stroke motion of the insert tool pass through a reversal or dead point at least substantially in a time-staggered manner, thereby enabling an advantageously good and precise cutting result to be achieved. "Obliquely" in this context is to be understood to mean, in particular, that the axis and the stroke direction enclose an angle that is more than 0° and less than 90°. Owing to the oblique disposition of the at least one contact surface, as viewed in the longitudinal direction of the at least one output element, a highest point of contact of the contact surface with the at least one rolling element, as viewed transversely in relation to the longitudinal direction of the at least one output element and transversely in relation to the stroke direction, is disposed in an offset manner relative to the stroke axis.

It is additionally proposed that at least one contact element, which at least partially constitutes the at least one contact surface, be disposed on the at least one bearing element. An advantageously robust design of the at least one contact surface can thereby be achieved. The at least one contact element is preferably realized in the form of a disk, and particularly preferably in the form of a circular ring. The at least one contact element is preferably fixedly connected to the at least one bearing element. It is also conceivable, however, for the at least one contact element to be mounted so as to be rotatable relative to the at least one bearing element. This would make it possible, in particular, to dispense with the at least one rotatably mounted rolling element that constitutes the at least one contact surface, disposed on the at least one output element, for generating the reciprocating motion.

It is additionally proposed that the transmission device have at least one setting unit for switching over between at least two driving modes, at least partially by displacement of the at least one bearing element relative to the at least one output element. It is thereby possible to achieve an advantageously flexible application capability of the hand-held power tool comprising the transmission device. Preferably, by means of the setting unit, a reciprocating motion can be switched on or off, at least partially and/or preferably entirely. The setting unit is preferably realized such that it can be operated, in particular manually, by an operator. The at least one bearing element can be displaced by the setting unit, preferably at least partially parallel to the longitudinal direction of the at least one output element.

Furthermore, it is proposed that the transmission device comprise at least one spring element, which applies a force to the at least one bearing element in at least one direction parallel to a longitudinal direction of the at least one output element. It is thereby possible to achieve low vibrations in an operating state, in particular in the case of an initial saw cut. The at least one spring element is designed to bias the at least one bearing element, at least partially, toward the at least one output element for the purpose of contacting the contact surfaces, thereby making it possible to achieve advantageously reliable contacting of the contact surfaces, even in the case of "overhead" working. Alternatively or additionally, it is conceivable for the at least one spring element to be designed, preferably, to bias the at least one bearing element at least partially contrary to the displacement direction, for the purpose of switching over between the driving modes by means of the at least one setting unit.

Additionally proposed is a hand-held power tool having at least one transmission device according to the disclosure. It is thereby possible to achieve an advantageously slender design of the hand-held power tool, in particular having an advantageously small housing diameter in a neck region of the hand-held power tool. Moreover, by simple design means it is possible to achieve advantageously good sealing of the transmission device, inside the hand-held power tool, against ingress of dust, and contamination of the transmission device can be prevented, at least to a very large extent. Preferably, the hand-held power tool is realized as an electric hand-held power tool. The hand-held power tool may be realized as a battery-operated hand-held power tool or as a mains-operated hand-held power tool. Particularly preferably, the hand-held power tool is realized as a saber saw. However, it is also conceivable for it to be designed as jig saw, or in another manner considered appropriate by persons skilled in the art. Preferably, the hand-held power tool has an EC motor.

Additionally proposed is a method for generation of a stroke motion and/or reciprocating motion of the insert tool of a hand-held power tool by the transmission device, comprising at least one step, in which the stroke motion is generated by means of the at least one contact surface, which is disposed on at least one output element, and comprising at least one further step, in which the reciprocating motion is generated by means of the at least one further contact surface, which is disposed on the at least one output element. Preferably, the steps are performed at least partially simultaneously.

The transmission device according to the disclosure in this case is not intended to be limited to the application and embodiment described above. In particular, the transmission device according to the disclosure may have individual elements, components and units that differ in number from a number stated herein, in order to fulfill a principle of function described herein.

BRIEF DESCRIPTION OF THE DRAWINGS

Further advantages are disclosed by the following description of the drawing. The drawing shows an exemplary embodiment of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
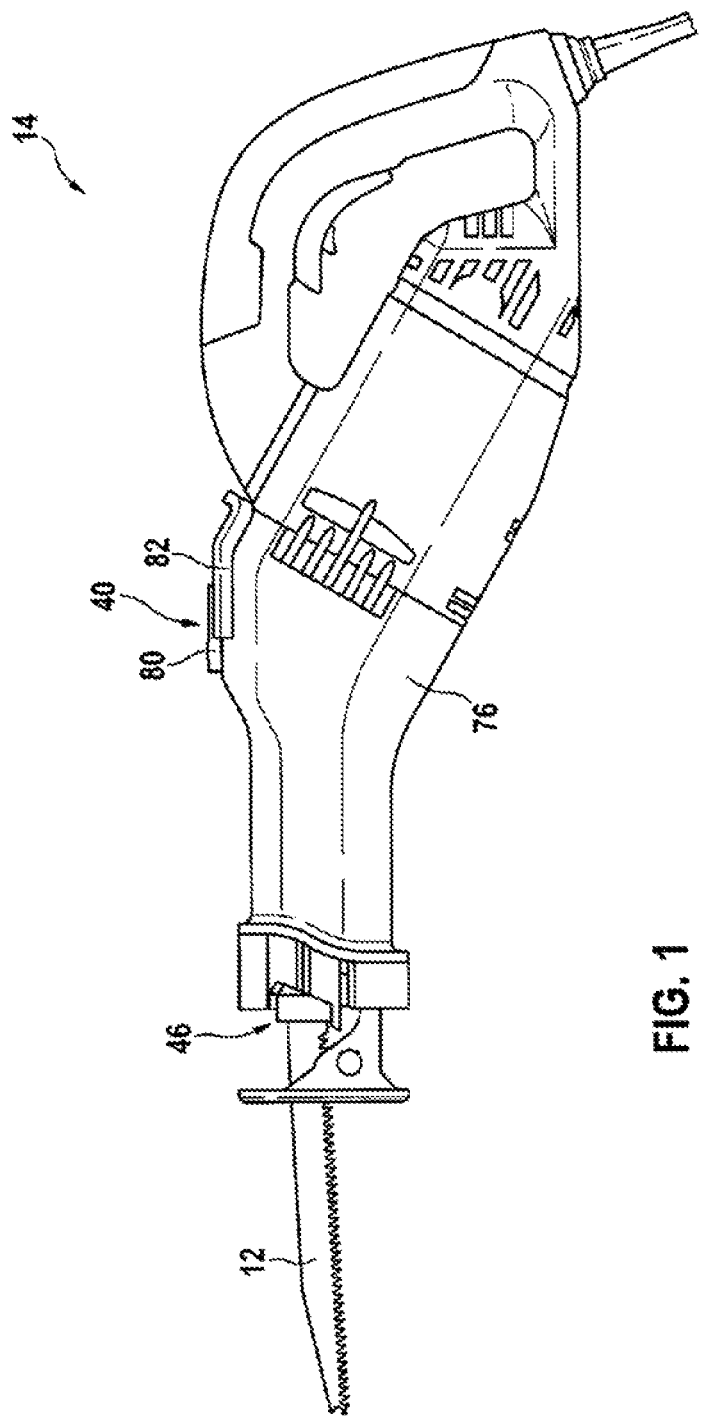
FIG. 1 a hand-held power tool having a transmission device according to the disclosure, in a side view, FIG. 2 the hand-held power tool having the transmission device according to the disclosure, in a sectional view, FIG. 3 a portion of the hand-held power tool in the region of the transmission device according to the disclosure, in a sectional view, FIG. 4 the transmission device according to the disclosure, in an exploded representation, FIG. 5a an output element of the transmission device according to the disclosure, in a perspective representation, and FIG. 5b the output element of the transmission device according to the disclosure, in an exploded representation.
Figure 2:
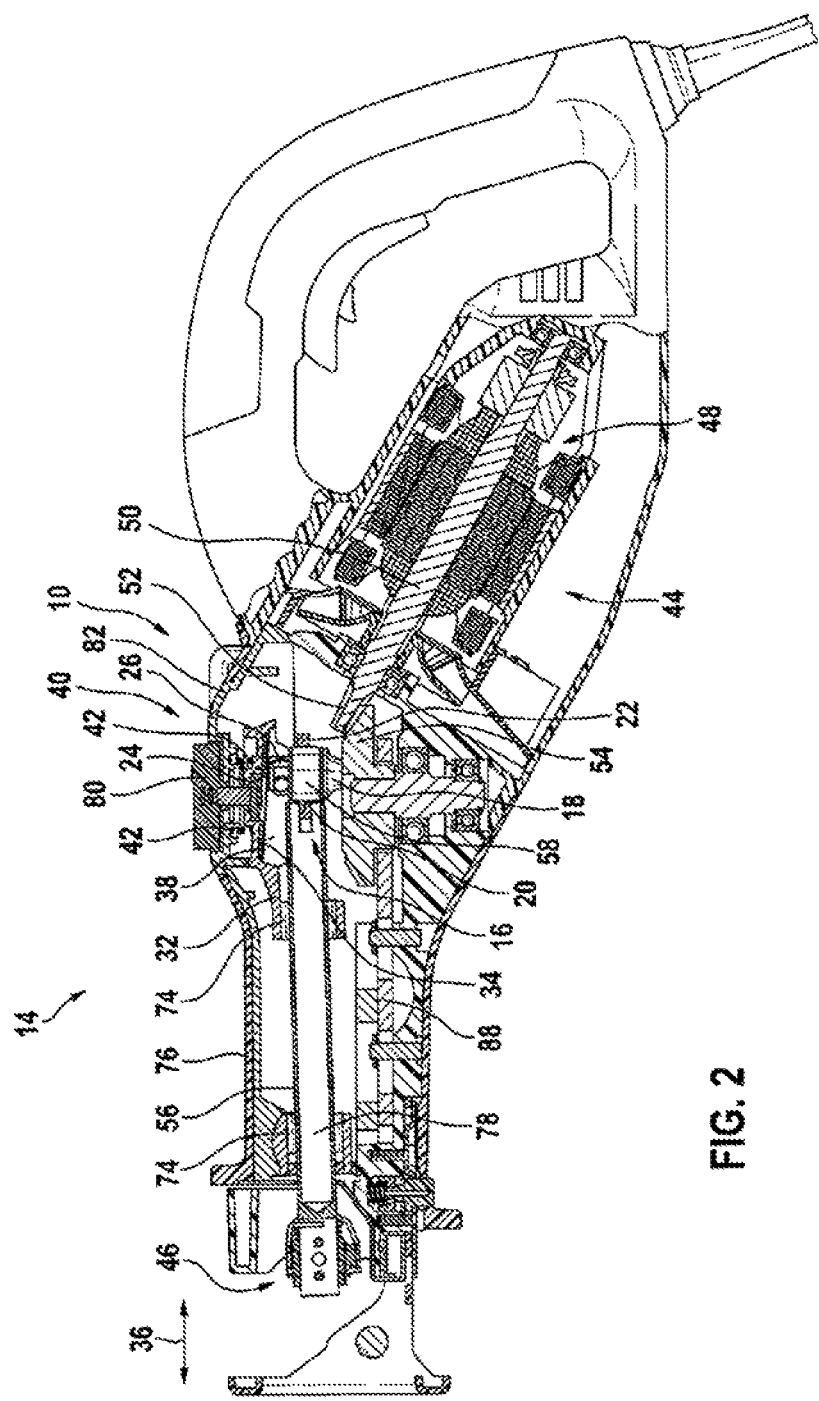

A hand-held power tool 14, realized as a saber saw, is represented in FIG. 1. The hand-held power tool 14 is realized as an electric hand-held power tool. The hand-held power tool 14 is realized as a mains-operated hand-held power tool 14, and has an electric power cable for electrical connection to a mains power supply. The hand-held power tool 14 has a total mass of between 3.7 kg and 4.2 kg. Alternatively, the hand-held power tool 14 may also be realized as a battery-operated hand-held power tool, having a battery interface for mechanical and electrical coupling to a battery pack. The hand-held power tool 14 has a drive unit 44 and a transmission device 10, and has a tool receiver 46 (FIG. 2). The drive unit 44 comprises an electric motor 48. The electric motor 48 is realized as an EC motor. The drive unit 44 comprises an output shaft 50, which is driven in rotation when the electric motor 48 is in an operating state. At an end that faces away from the electric motor 48, the output shaft 50 of the drive unit 44 has a tooth system 52, which constitutes a drive pinion. The tooth system 52 of the output shaft 50 constitutes a bevel gear. The transmission device 10 comprises a transmission element 54, constituted by a ring gear, with which the tooth system 52 of the output shaft 50 of the drive unit 44 engages. When the electric motor 48 is in an operating state, the rotating motion of the output shaft 50 is transferred to the transmission element 54 of the transmission device 10 via the tooth system 52. The transmission device 10 is designed to convert the rotating motion of the transmission element 54 into a stroke motion and/or reciprocating motion, which is transferred to an insert tool 12 disposed in the tool receiver 46. The tool receiver 46 is connected to the transmission device 10 via a stroke rod 56.

Figure 3:
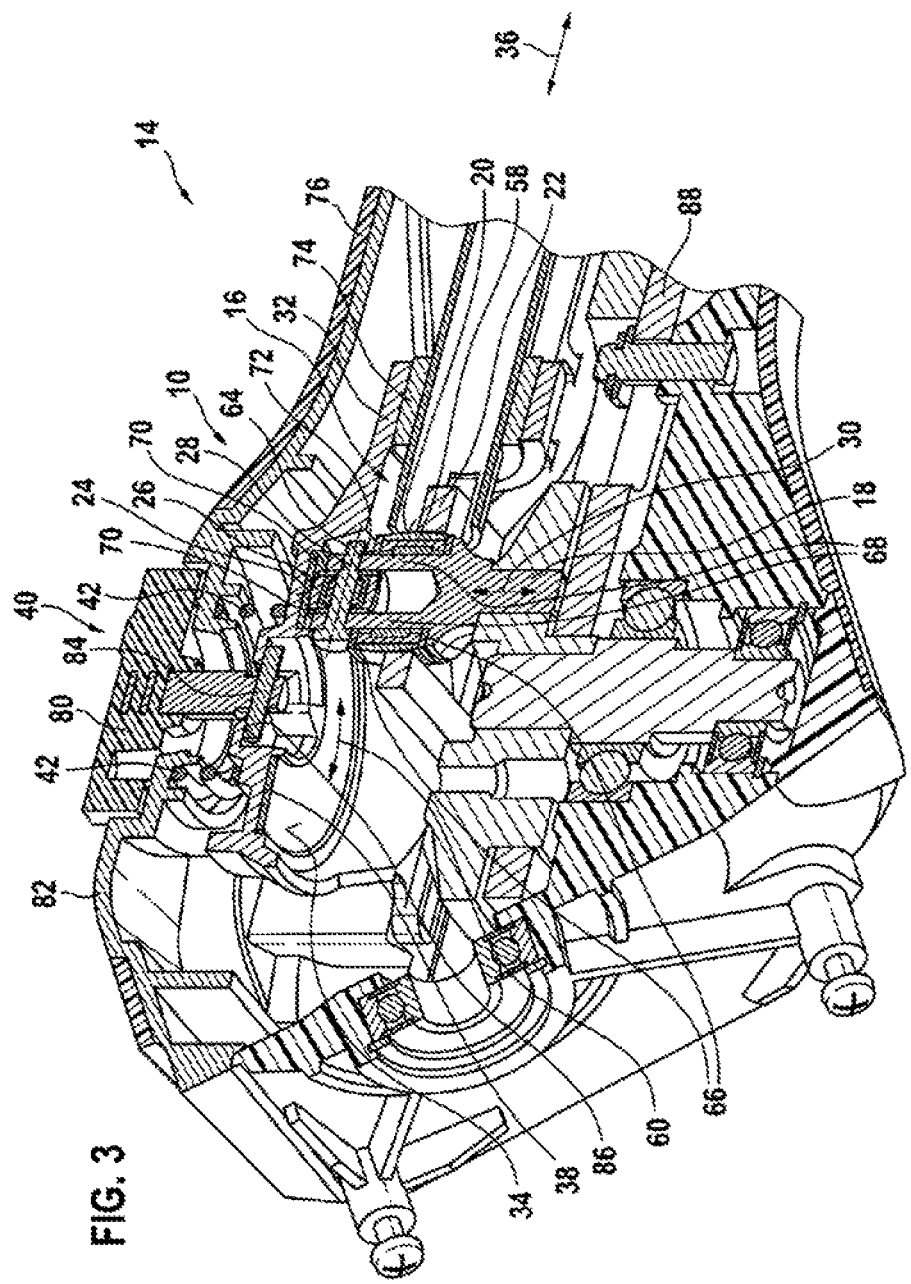
Figure 4:
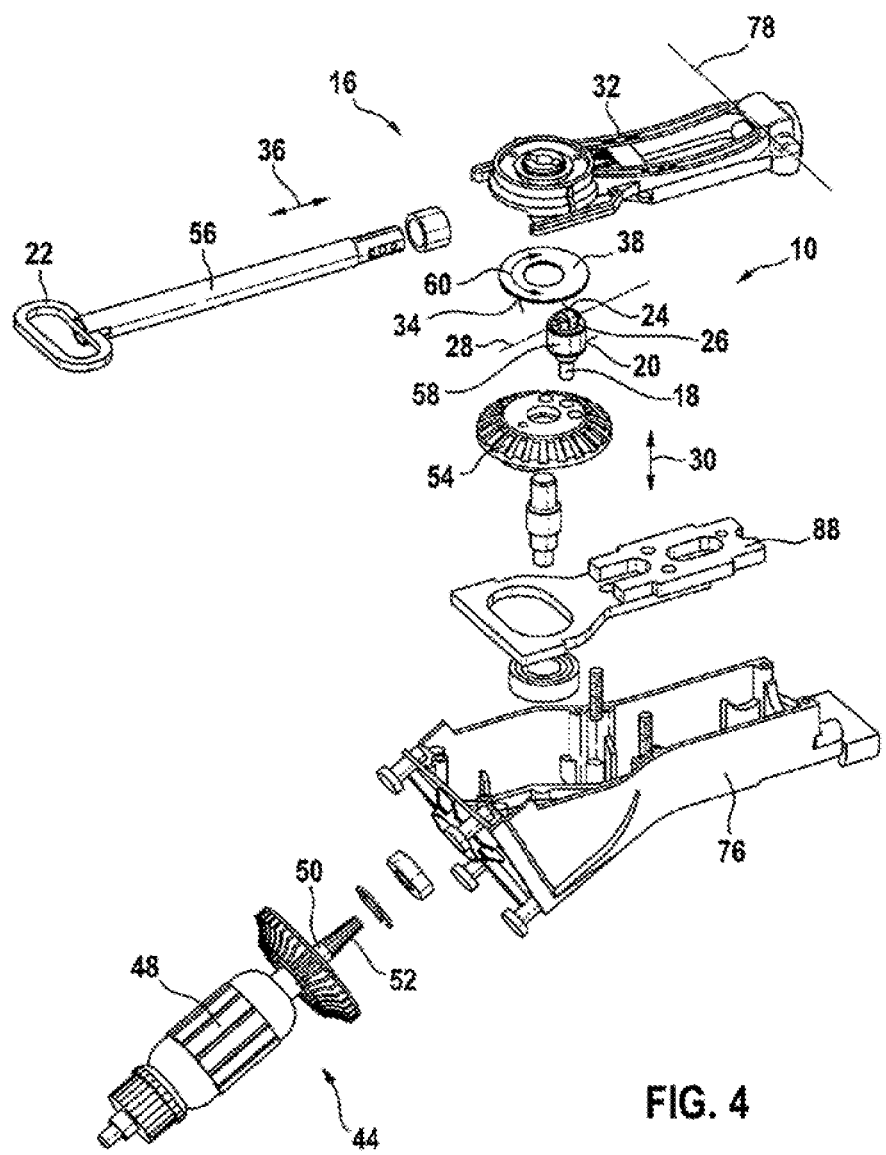

The transmission device 10 is shown in greater detail in FIGS. 3 and 4. The transmission device 10 is designed to generate the stroke motion and/or reciprocating motion of the insert tool 12 of the hand-held power tool 14. The transmission device 10 comprises at least one link unit 16, at least for generating the stroke motion, which has at least one output element 18 having at least one contact surface 20, the at least one contact surface 20 being disposed, at least partially, on the at least one output element 18. The at least one link unit 16 additionally comprises at least one link element 22, which acts in combination with the at least one output element 18 via the at least one contact surface 20. The transmission device 10 has precisely one link unit 16, having precisely one output element 18 and having precisely one link element 22. It is also conceivable, however, for there to be a different number, considered appropriate by persons skilled in the art, of the link unit 16, output element 18 and/or link element 22. The link element 22 constitutes a link path, along which the output element 18 can be moved in an operating state. The link element 22 constitutes an elongate link path, the smallest extent of which at least almost corresponds to a diameter of the output element 18. The link element 22 is coupled to the stroke rod 56. The link element 22 is fixedly connected to the stroke rod 56. The link element 22 is welded to the stroke rod 56. The link element 22 and the stroke rod 56 are made of metal. The transmission device 10 additionally comprises a compensating mass element 88, which is designed to compensate a mass of the stroke rod 56, and which is likewise realized such that it can be driven via the transmission element 54.

Figure 5A:
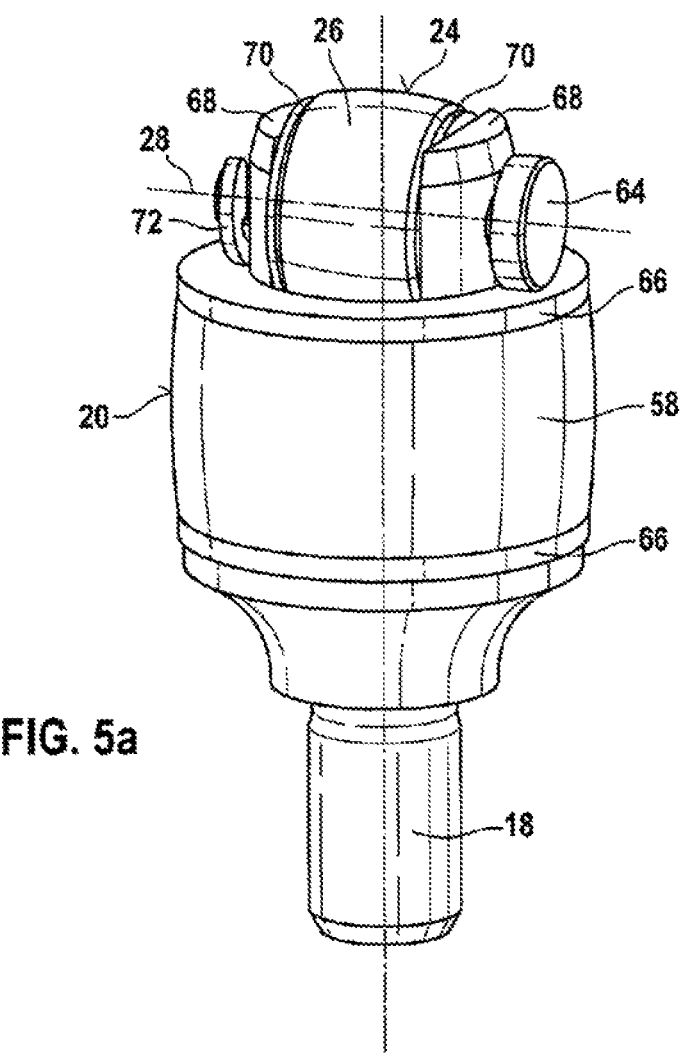
Figure 5B:
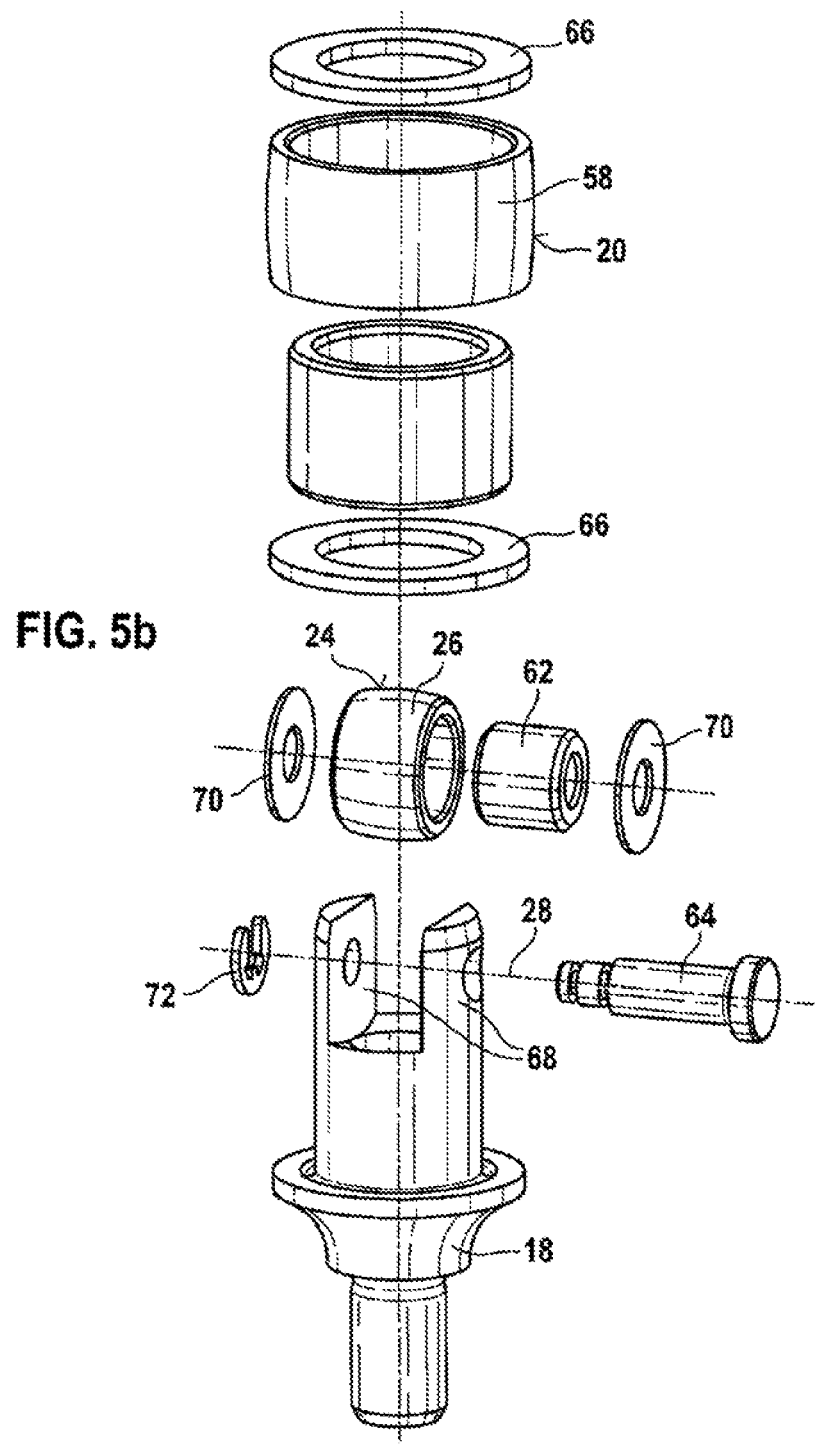

The output element 18 is realized as an output pin (FIG. 5a). The output element 18 is fixedly connected to the transmission element 54 realized as a ring gear. The output element 18 is disposed on the transmission element 54, eccentrically relative to a rotation axis of the transmission element 54. The output element 18 is pressed into a recess in the transmission element 54. The link unit 16 comprises at least one rolling element 58, which constitutes, at least partially, the at least one contact surface 20 for initiating the stroke motion. The link unit 16 comprises precisely one rolling element 58, which constitutes the precisely one contact surface 20 for initiating the stroke motion. The rolling element 58 is disposed on the output element 18. The rolling element 58 is realized as a roller bearing. The rolling element 58 is realized as a radial bearing. The rolling element 58 is mounted in a rotatable manner on the output element 18. The rolling element 58 extends in the circumferential direction around the output element 18. A circumferential surface of the rolling element 58 constitutes the contact surface 20. By means of the contact surface 20, the output element 18 is guided in the link path constituted by the link element 22. In an operating state, the output element 18 is driven on a circular path around the rotation axis of the transmission element 54. The output element 18 in this case moves translationally relative to the link element 22, inside the link path, and additionally displaces the link element 22 translationally in a stroke direction 36, which is perpendicular to a direction of a translational relative motion of the output element 18 and of the link element 22. The stroke direction 36 and the direction of the translational relative motion of the output element 18 and of the link element 22 are each perpendicular to a longitudinal direction 30 of the output element 18. The longitudinal direction 30 of the output element 18 is parallel to a direction in which the output element 18 is pressed into the transmission element 54. The motion in the stroke direction 36 is transferred from the link element 22 to the stroke rod 56, and thus to the insert tool 12 held in the tool receiver 46.

The link unit 16 additionally has at least one further contact surface 24, for generating a force component for initiating the reciprocating motion, which is disposed, at least partially, on the output element 18. The link unit 16 has precisely one further contact surface 24 that is disposed on the output element 18. The further contact surface 24 is realized so as to be at least partially separate from the contact surface 20. The further contact surface 24 is realized so as to be entirely separate from the contact surface 20. The link unit 16 comprises at least one rotatably mounted rolling element 26, which constitutes, at least partially, the contact surface 24 for generating a force component for initiating the reciprocating motion. The link unit 16 comprises precisely one rotatably mounted rolling element 26. The rolling element 26 constitutes the contact surface 24. The rolling element 26 is mounted so as to be rotatable relative to the output element 18. The rolling element 26 is rotatably mounted on the output element 18. The rolling element 26 is mounted so as to be rotatable about an axis 28 disposed perpendicularly in relation to the longitudinal direction 30 of the output element 18. The rolling element 26 is constituted by a ball bush. The rolling element 26 is rotatably mounted on the output element 18 by means of a roller bearing 62 and a bearing pin 64. The roller bearing 62 is realized as a ball bearing. The rolling element 26 constituted by the ball bush is pressed onto the roller bearing 62. The rolling element 26, as viewed in the longitudinal direction 30 of the output element 18, is disposed on a front end of the output element 18.

For the purpose of assembling the output element 18, in a first step the rolling element 58 is pushed onto the output element 18, in the longitudinal direction 30 of the output element 18. The rolling element 58 in this case, as viewed in the longitudinal direction 30 of the output element 18, is disposed between two spacer washers 66. In a further step, the rolling element 26 constituted by the ball bush is pressed onto the roller bearing 62. The rolling element 26, with the roller bearing 62, is then disposed between two bearing extensions 68 of the output element 18. In each case, there is a spacer washer 70 disposed, respectively, between one of the bearing extensions 68 of the output element 18 and the rolling element 26 with the roller bearing 62. The bearing extensions 68 of the output element 18 each have a circular recess. In a further step, the bearing pin 64, as viewed perpendicularly in relation to the longitudinal direction 30 of the output element 18, is pushed through the recesses of the bearing extensions 68 of the output element 18 and through the spacer washers 70 and the roller bearing 62, onto which the rolling element 26 has been pressed. When the bearing pin 64 is in an end position, a head region of the bearing pin 64 bears against one of the bearing extensions 68 of the output element 18. An end of the bearing pin 64 that faces away from the head region of the bearing pin 64 projects out of the recess of the other of the bearing extensions 68 of the output element 18 and, by means of a snap ring 72, is secured against slipping out. The fully assembled output element 18 is then pressed into the recess in the transmission element 54 constituted by the ring gear. The output element 18 is pressed into the transmission element 54 by an end that, as viewed in the longitudinal direction 30 of the output element 18, is disposed opposite the rolling element 26.

The transmission device 10 has at least one bearing element 32, for supporting the link element 22, disposed on which there is at least one contact surface 34 that, in at least one operating mode, at least partially contacts the further contact surface 24, disposed on the output element 18, for generating the force component for initiating the reciprocating motion. The transmission device 10 has precisely one bearing element 32. The transmission device 10 may also comprise a plurality of bearing elements 32. The bearing element 32 is designed to indirectly support the link element 22. The bearing element 32 is realized as a bearing rocker. The bearing element 32 has at least one axial bearing 74 for supporting the stroke rod 56 and the link element 22 connected thereto. The bearing element 32 has two axial bearings 74. However, a different number of the axial bearings 74, considered appropriate by persons skilled in the art, is also conceivable. The stroke rod 56 and the link element 22 are mounted so as to be displaceable relative to the bearing element 32 in the stroke direction 36. The bearing element 32 is mounted so as to be movable relative to a housing 76 of the hand-held power tool 14 that comprises the transmission device 10. The bearing element 32 is mounted so as to be pivotable relative to the housing 76 of the hand-held power tool 14. The bearing element 32 supports the stroke rod 56 in a pivotable manner relative to the housing 76 of the hand-held power tool 14. The bearing element 32 is made at least partially of metal. The bearing metal 32 is made entirely of metal.

Precisely one contact surface 34, for contacting the contact surface 24 constituted by the rolling element 26, is disposed on the bearing element 32. However, a plurality of contact surfaces 34 are also conceivable. The contact surface 34 disposed on the bearing element 32 is inclined about at least one axis, the axis extending in a plane, the surface normal of which is disposed parallel to the longitudinal direction 30 of the output element 18. Moreover, the axis about which the contact surface 34 is disposed in an inclined manner is disposed obliquely in relation to the stroke direction 36 of the stroke rod 56 in the case of the stroke motion. The contact surface 34 is constituted by a plane. A surface normal of the contact surface 34 is disposed obliquely in relation to the longitudinal direction 30 of the output element 18. In addition, at least one contact element 38, which at least partially constitutes the contact surface 34, is disposed on the bearing element 32. Precisely one contact element 38, which entirely constitutes the contact surface 34, is disposed on the bearing element 32. The contact element 38 is constituted by a disk. The contact element 38 has a base in the form of a circular ring. The contact element 38 is captively connected to the bearing element 32. The contact element 38 is frictionally connected to the bearing element 32. The contact element 38 is pressed into a recess in the bearing element 32. It is also conceivable, however, for the contact element 38 to be connected to the bearing element 32 in another manner, considered appropriate by persons skilled in the art, such as, for example, by adhesive bonding, soldering and/or welding, by a positive engagement, by a screwed or riveted connection, by a clamped connection or by an integral design. The contact element 38 is made at least partially of metal. The contact element 38 is made entirely of metal. The contact element 38 is made of hardened metal.

In an operating state, the rolling element 26 rolls on the contact surface 34 that is disposed on the bearing element 32. A rolling direction 60 of the rolling element 26 is tangential to a circumferential direction of the contact element 38. The bearing element 32 is biased toward the rolling element 26 by a force of at least one spring element 42, or alternatively by the weight force, in the region of the contact element 38. The bearing element 32 is thus pressed onto the output element 18, in order to achieve the contacting of the contact surfaces 24, 34. In an operating state, the output element 18 moves along the circumferential direction of the transmission element 54, as a result of the rotation of the transmission element 54 realized as a ring gear. The rolling element 26 disposed on the output element 18 in this case rolls on the contact element 38, which is disposed on the bearing element 32. Consequently, the contact element 38, the surface normal of which encloses an angle of greater than 0° and less than 90° with the longitudinal direction 30 of the output element 18, is displaced in the longitudinal direction 30 by the rolling element 26, as a result of which the bearing element 32, on which the contact element 38 is disposed, is pivoted about a bearing rotation axis 78. This pivot motion of the bearing element 32 is transferred to the stroke rod 56, and thus to the insert tool 12, thereby achieving the reciprocating motion of the insert tool 12.

The stroke motion is generated in a step by means of the contact surface 20, which is disposed on the output element 18. The reciprocating motion is generated in a further step by means of the further contact surface 24, which is disposed on the output element 18. The steps for generating the stroke motion and the reciprocating motion are provided simultaneously in at least one driving mode. In an operating state, in at least one driving mode, the reciprocating motion and the stroke motion are superimposed. The stroke motion has a stroke of 32 mm. The reciprocating stroke motion has a stroke of 4 mm, with swiveling by 3° to 4° being provided.

As viewed in the longitudinal direction 30 of the output element 18, an offset is provided between the bearing rotation axis 78, about which the bearing element 32 is pivotally mounted, and the contact surface 24 for generating the reciprocating motion, which is disposed on the output element 18, such that generation of the reciprocating motion is possible even when the contact surface 34 that is disposed on the bearing element 32 is disposed perpendicularly in relation to the longitudinal direction 30 of the output element 18.

The contact element 38, as viewed in the stroke direction 36, is disposed asymmetrically, such that a highest point of a rolling path of the rolling element 26 on the contact element 38, as viewed in the longitudinal direction 30 of the output element 18, is disposed, perpendicularly in relation to the longitudinal direction 30 of the output element 18 and perpendicularly in relation to the stroke direction 36, in an offset manner in relation to a stroke axis of the stroke rod 56. Consequently, the reciprocating motion of the insert tool 12 and the stroke motion of the insert tool 12 attain a reversal or dead point in a time-staggered manner.

The transmission device 10 has at least one setting unit 40 for switching over between at least two driving modes, at least partially by displacement of the bearing element 32 relative to the output element 18 (FIG. 3). The transmission device 10 has precisely one setting unit 40. Also conceivable, however, is a different number of setting units 40, considered appropriate by persons skilled in the art. The setting unit 40 is designed to switch over between three driving modes. However, switching over between a different number of driving modes is also conceivable. The setting unit 40 is designed to switch over between the driving modes by displacement of the bearing element 32 at least partially parallel to the longitudinal direction 30 of the output element 18. The setting unit 40 comprises at least one operating element 80 for manual operation by the operator of the hand-held power tool 14. The setting unit 40 comprises precisely one operating element 80. However, the setting unit 40 may also comprise a plurality of operating elements 80. The operating element 80 is constituted by a rotary knob.

The operating element 80 is integrated in the housing 76 of the hand-held power tool 14 and realized so as to be accessible by the operator of the hand-held power tool 14. The operating element 80 is integrated into a transmission cover 82 of the housing 76 of the hand-held power tool 14. The transmission cover 82 is made of metal. It is also conceivable, however, for the transmission cover 82 to be made of a fiber-reinforced plastic or of another material considered appropriate by persons skilled in the art. The operating element 80 is made of plastic. It is also conceivable, however, for the operating element 80 to be made of another material considered appropriate by persons skilled in the art.

The setting unit 40 additionally has a transfer element 84, which is designed to transfer a setting movement of the operating element 80 to the bearing element 32. The transfer element 84 is fixedly connected to the operating element 80. The transfer element 84 is realized as a transverse pin. The transfer element 84 has a longitudinal direction that is perpendicular to a rotation axis of the operating element 80. The rotation axis of the operating element 80, about which the operating element 80 can be rotated for the purpose of switchover, is parallel to the longitudinal direction 30 of the output element 18. The transfer element 84 is made of metal. The transfer element 84 contacts the bearing element 32 at a setting contact surface 86. The setting contact surface 86 has a surface normal that is oblique in relation to the rotation axis of the operating element 80. The setting contact surface 86 is realized in the form of a circular ring.

The setting contact surface 86, as viewed in the radial direction, is disposed radially inside the contact surface 34 that is constituted by the contact element 38 and, as viewed in the longitudinal direction 30 of the output element 18, is offset from the contact surface 34 that is constituted by the contact element 38.

The transmission device 10 has the at least one spring element 42, which applies a force to, or biases, the bearing element 32 in at least one direction parallel to the longitudinal direction 30 of the output element 18. The transmission device 10 has a plurality of spring elements 42, which are disposed between the transmission cover 82 of the housing 76 of the hand-held power tool 14 and the bearing element 32. The spring elements 42 are each constituted by a helical spring. The spring elements 42 are disposed on a side of the bearing element 32 that, as viewed in the longitudinal direction 30 of the output element 18, is opposite the contact element 38. The spring elements 42 press the bearing element 32, by the contact surface 34 that is constituted by the contact element 38, toward the output element 18. For the purpose of initiating the reciprocating motion, the rolling element 26 disposed on the output element 18 moves the bearing element 32, in an operating state, against the force of the spring elements 42. In addition, the spring elements 42 press the bearing element 32, by the setting contact surface 86, against the transfer element 84 of the setting unit 40.

Rotation of the operating element 80, and thus of the transfer element 84, causes the transfer element 84 to go along the obliquely disposed setting contact surface 86 of the bearing element 32, as a result of which the bearing element 32 is displaced, relative to the output element 18, against the force of the spring elements 42. In a first driving mode, which is realized as a reciprocating mode, the rolling element 26, in an operating mode, bears permanently against the contact element 38 and rolls entirely on the contact element 38. The transfer element 84 in this case contacts a point of the setting contact surface 86 that is close to the output element 18. In the first driving mode, the transmission device 10 generates a reciprocating stroke motion.

Rotation of the operating element 80 causes the transfer element 84 to be displaced along the obliquely disposed setting contact surface 86 of the bearing element 32, as a result of which the bearing element 32 is displaced, against the force of the spring elements 42, parallel to the longitudinal direction 30 of the output element 18, toward the transmission cover 82 and away from the output element 18. The bearing element 32 in this case pivots about the bearing rotation axis 78. In this second driving mode, the rolling element 26 disposed on the output element 18 contacts the contact element 38, in an operating state, only along a portion of an orbit of the output element 18 and rolls only partially, or temporarily, on the contact element 38. Along a portion of the orbit of the output element 18, in the second driving mode, the rolling element 26 is disposed at a distance from the contact element 38. In the second driving state, the transmission device 10 generates a stroke motion with partial superimposition of a reciprocating motion.

Further rotation of the operating element 80 causes the transfer element 84 to be displaced further along the obliquely disposed setting contact surface 86 of the bearing element 32, as a result of which the bearing element 32 is displaced, contrary to the force of the spring elements 42, parallel to the longitudinal direction 30 of the output element 18, further toward the transmission cover 82 and away from the output element 18. The bearing element 32 in this case pivots about the bearing rotation axis 78. In this third driving mode, the rolling element 26 disposed on the output element 18 is disposed at a distance from the contact element 38 along the entire orbit of the output element 18. In the third driving state, the transmission device 10 generates a pure stroke motion.

What is claimed is:

1. A transmission device, the transmission device configured to generate a stroke motion and a reciprocating motion of an insert tool of a hand-held power tool, the transmission device comprising:
   at least one link unit that includes:
      at least one output element arranged on a gear;
      at least one first contact surface that is disposed at least partially on the at least one output element;
      at least one link element that is configured to act in combination with the at least one output element via the at least one first contact surface to produce the stroke motion in a stroke direction; and
      at least one second contact surface that is disposed at least partially on the at least one output element, and that is configured to generate a force component to initialize the reciprocating motion in a reciprocating direction that is different from the stroke direction.

2. The transmission device of claim 1, wherein the link unit further includes:
   at least one rotatably mounted rolling element that at least partially defines the at least one second contact surface.

3. The transmission device of claim 2, wherein the at least one output element defines a longitudinal direction that is perpendicular to the stroke direction and parallel to the reciprocating direction, and the at least one rolling element is mounted so as to be rotatable about an axis that is perpendicular to the longitudinal direction of the at least one output element.

4. The transmission device of claim 2, wherein the at least one rolling element includes a ball bush.

5. The transmission device of claim 1, further comprising:
   at least one bearing element configured to support the at least one link element; and
   at least one third contact surface that is configured to contact the at least one second contact surface in at least one operating mode, and that is disposed on the at least one bearing element.

6. The transmission device of claim 5, wherein the at least one third contact surface is inclined about at least one axis extending in a plane having a surface normal disposed parallel to a longitudinal direction of the at least one output element, and extending obliquely in relation to the stroke direction.

7. The transmission device of claim 5, further comprising:
   at least one contact element that at least partially defines the at least one third contact surface, and that is disposed on the at least one bearing element.

8. The transmission device of claim 5, further comprising:
   at least one setting unit that is operable to switch over between at least two driving modes at least partially via displacement of the at least one bearing element relative to the at least one output element.

9. The transmission device of claim 5, further comprising:
   at least one spring element configured to apply a force to the at least one bearing element in at least one direction parallel to a longitudinal direction of the at least one output element.

10. A hand-held power tool, comprising:
    a transmission device that is configured to generate a stroke motion and a reciprocating motion of an insert tool for the hand-held power tool, and that includes:
       at least one link unit that has:
          at least one output element arranged on a gear;
          at least one first contact surface that is disposed at least partially on the at least one output element;
          at least one link element that is configured to act in combination with the at least one output element via the at least one first contact surface to produce the stroke motion in a stroke direction; and
          at least one second contact surface that is disposed at least partially on the at least one output element, and that is configured to generate a force component to initialize the reciprocating motion in a reciprocating direction that is different from the stroke direction.

11. A method of generating motion of an insert tool of a hand-held power tool, the method comprising:
    generating a stroke motion in a stroke direction via at least one first contact surface that is disposed on at least one output element of at least one link unit of a transmission device, the link unit further including at least one link element that is configured to act in combination with the at least one output element via the at least one first contact surface; and
    generating a reciprocating motion in a reciprocating direction that is different from the stroke direction via at least one second contact surface that is disposed on the at least one output element;
    wherein the at least one output element is arranged on a gear.

* * * * *